US010527131B2

(12) United States Patent
Strom et al.

(10) Patent No.: US 10,527,131 B2
(45) Date of Patent: Jan. 7, 2020

(54) SELECTABLE DRIVE PRINTING DEVICE

(71) Applicant: Hewlett-Packard Development Company, L.P., Houston, TX (US)

(72) Inventors: Eric Berner Strom, Canby, WA (US); John J Cantrell, Camas, WA (US); Robert Lawrence Winburne, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/763,493

(22) PCT Filed: Jan. 21, 2016

(86) PCT No.: PCT/US2016/014349
§ 371 (c)(1),
(2) Date: Mar. 27, 2018

(87) PCT Pub. No.: WO2017/127087
PCT Pub. Date: Jul. 27, 2017

(65) Prior Publication Data
US 2018/0283500 A1    Oct. 4, 2018

(51) Int. Cl.
*F16H 1/22* (2006.01)
*B41J 3/44* (2006.01)
*B41J 23/04* (2006.01)
*B29C 64/236* (2017.01)
*H04N 1/00* (2006.01)
(Continued)

(52) U.S. Cl.
CPC ........... *F16H 1/222* (2013.01); *B29C 64/236* (2017.08); *B41J 2/16508* (2013.01); *B41J 2/16511* (2013.01); *B41J 3/44* (2013.01); *B41J 23/025* (2013.01); *B41J 23/04* (2013.01); *B41J 29/02* (2013.01); *B41J 29/13* (2013.01); *B41J 29/38* (2013.01); *F16H 1/22* (2013.01);
(Continued)

(58) Field of Classification Search
CPC ......... F16H 1/222; F16H 1/22; B29C 64/236; B41J 2/16508; B41J 2/16511; B41J 3/44; B41J 23/025; B41J 23/04; B41J 29/02; B41J 29/13; B41J 29/38; H04N 1/00596; H04N 1/00655; H04N 1/04; B33Y 30/00
See application file for complete search history.

(56) References Cited

U.S. PATENT DOCUMENTS 6,309,044 B1    10/2001  Gaarder
6,749,298 B1    6/2004   Schalk et al.
(Continued)

FOREIGN PATENT DOCUMENTS

CN    1511705    7/2004
CN    1915671    2/2007
(Continued)

*Primary Examiner* — Iriana Cruz
(74) *Attorney, Agent, or Firm* — Fabian VanCott

(57) ABSTRACT

A selectable drive printing device includes a drive selector system to select between driving a print drive system and driving a scan drive system based at least partially on a position of a selector swing arm of the drive selector system. The selectable drive printing device includes a shifter to selectively shift the drive selector system between a scanning system drive position of the selector swing arm and a printing system drive position of the selector swing arm.

20 Claims, 10 Drawing Sheets

(51) Int. Cl.
  *B41J 23/02* (2006.01)
  *B41J 2/165* (2006.01)
  *B41J 29/02* (2006.01)
  *B41J 29/38* (2006.01)
  *B41J 29/13* (2006.01)
  *B33Y 30/00* (2015.01)

(52) U.S. Cl.
  CPC ..... *H04N 1/00596* (2013.01); *H04N 1/00655* (2013.01); *B33Y 30/00* (2014.12)

(56) References Cited

U.S. PATENT DOCUMENTS

| | | |
|---|---|---|
| 7,306,216 B2 | 12/2007 | Lee et al. |
| 7,448,620 B2 | 11/2008 | Ha |
| 7,527,349 B2 | 5/2009 | Jung et al. |
| 8,141,457 B2 | 3/2012 | Chu et al. |
| 9,181,988 B2 | 11/2015 | Shinagawa et al. |
| 2004/0057071 A1 | 3/2004 | Lin et al. |
| 2004/0099090 A1 | 5/2004 | Hsu et al. |
| 2004/0124575 A1* | 7/2004 | Lee .......................... B65H 3/08 271/10.01 |
| 2005/0028627 A1* | 2/2005 | Fleytman ................. F16H 1/08 74/416 |
| 2009/0174733 A1 | 7/2009 | Balcan |

FOREIGN PATENT DOCUMENTS

| | | |
|---|---|---|
| CN | 102207171 | 10/2011 |
| EP | 0650843 | 5/1995 |
| EP | 0955168 | 11/1999 |

\* cited by examiner

SELECTABLE DRIVE PRINTING DEVICE

BACKGROUND

Printing devices provide a user with a hardcopy of a document by printing a representation of the document from digital data onto a print medium. The printing device, such as a two dimensional (2D) printing device, includes a number of components such as a carriage with a number of printheads coupled thereto. The printheads are used to eject printing fluid or other printable material onto the print medium to form an image. The carriage moves along a carriage rail via a motor to eject the printing fluid onto the print medium to form the image. Further, the printing device may be a 3 dimensional (3D) printing device. The 3D printing device uses printheads to print on a bed of build material to create a 3D object.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1A:
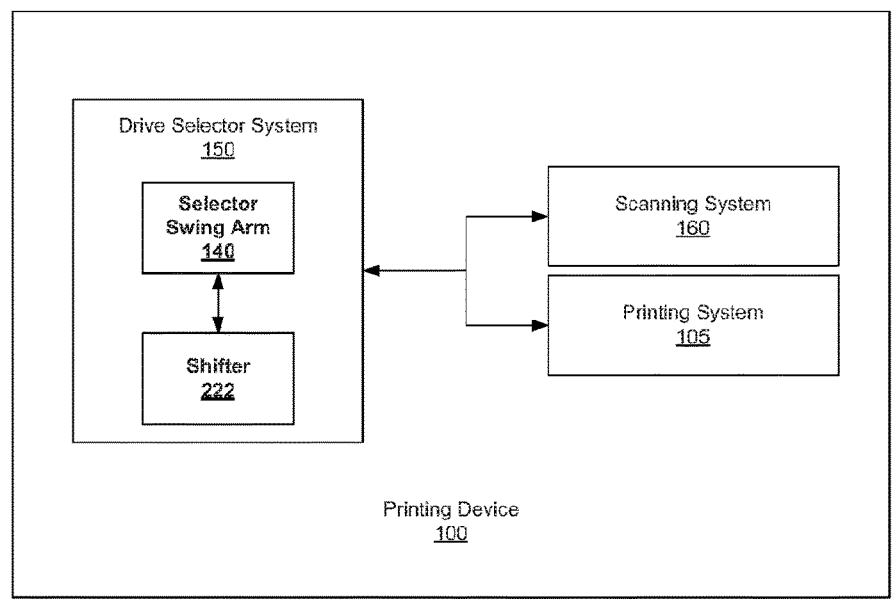
FIG. 1A is a block diagram of a printing device including a drive selector system, according to one example of the principles described herein.

In some printing devices, a document scanning system is incorporated to allow the printing device to also provide digital images to a user. In this example, documents may be fed through a number of rollers of the scanning system, and optically scanned using a bright light from, for example a light emitting diode (LED) or a fluorescent bulb to illuminate the document. An optical array including, for example, a charge-coupled device (CCD) is used to capture the image of the document. The inclusion of a scanning system within a printing device is convenient to a user since the user can reclaim desktop space by not having both a printing device and a separate scanning device taking up space on the desktop.

However, the incorporation of a scanning system within a printing device can make the footprint of the printing device unmarketably large. Further, the incorporation of a scanning system within a printing device can cost more to a consumer due to the additional hardware such as motors, sets of document feed rollers, and electronics used to make the printing and scanning systems work within the overall device. In this manner, an all-in-one (AIO) printing device, for example, that incorporates a scanning system into a printing device may have a larger footprint and cost more than is marketable to consumers. With the general desire from consumers for devices such as printing and scanning devices to be smaller, more compact printing and scanning devices are manufactured.

Examples described herein provide a selectable drive printing device. The selectable drive printing device includes a drive selector system to select between driving a print drive system and driving a scan drive system based at least partially on a position of a selector swing arm of the drive selector system, and a shifter to selectively shift the drive selector system between a scanning system drive position of the selector swing arm and a printing system drive position of the selector swing arm. The selector swing arm includes a first selector gear meshed with a drive gear coupled to the feedshaft, a second selector gear, and a pivot. The selector swing arm pivots about the pivot to selectively mesh with a scan drive gear of the scan drive system.

The scan drive gear is mechanically coupled to a power take-off (PTO) shaft to drive the scan drive of the scan drive system. The scan drive system includes a number of preliminary scan gears driven by the selector swing arm, a power take-off (PTO) shaft mechanically coupled to the preliminary scan gears, and a scan drive mechanically coupled to the PTO. The preliminary scan gears include a number of bevel gears to transfer motion of the scan drive system approximately 90-degrees.

The scan drive includes a worm gear set including a worm and a worm gear to transfer motion of the scan drive system approximately 90-degrees. In one example, the worm gear set is geared to maximize available torque to the scan path.

Further, examples described herein provide a drive selector system for selecting between driving a print drive system and driving a scan drive system. The drive selector system includes a feedshaft, and a selector swing arm. The selector swing arm includes a first selector gear meshed with a drive gear coupled to the feedshaft, a second selector gear, and a pivot. The selector swing arm pivots about the pivot to selectively mesh with a scan drive gear of the scan drive system.

In one example, the first selector gear is continually meshed with the drive gear. The second selector gear is meshed with the scan drive gear of the scan drive system when the selector swing arm is in a scanning system drive position about the pivot and is neutral when the selector swing arm is in a printing system drive position about the pivot. The position of the selector swing arm with respect to the pivot used to selectively mesh with the scan drive gear of the scan drive system is based at least partially on a positon of a shifter rotatably coupled to the feedshaft.

Further, examples described herein provide a scan drive system of a selectable drive printing device. The scan drive system includes a number of preliminary scan gears driven by a selector swing arm of the selectable drive printing device, a power take-off (PTO) shaft mechanically coupled to the preliminary scan gears, and a scan drive mechanically coupled to the PTO. The preliminary scan gears comprise a number of bevel gears to transfer motion of the scan drive system approximately 90-degrees. The scan drive includes a worm gear set including a worm and a worm gear to transfer motion of the scan drive system approximately 90-degrees. The scan drive system is mechanically coupled to a feedshaft of the selectable drive printing device. The feedshaft drives both the scan drive system and a print drive system based at least partially on a position of a selector swing arm mechanically coupled to the feedshaft.

Thus, the examples described herein provide a less expensive printing and scanning device with a smaller footprint due to the use of a single motor to drive both the printing system and the scanning system within an AIO printing device. This removes dedicated motor and servo controls used to operate a scan drive of a scanning system from the printer, which is a cost that may be otherwise passed onto the consumer. This cost reduction may be on the order of, for example, approximately $1.00 per unit manufactured, which is a relatively significant manufacturing cost savings over competing AIO products.

Further, arrangement of the printing system and scanning system within the printing device as described in the examples herein provides for serialization of the printing and scanning functions of the AIO printing and scanning device to reduce the footprint and general size of the AIO device. Specifically, the use of a power take-off (PTO) shaft to connect a lower drive to an upper drive provides a solution to the complex of joining a drive system for a scanning system between the base and the top case of the AIO printing device, and dealing with the large amount of dimensional variation between those systems. Further, mounting a worm gear set in an upper housing of the AIO printing device reduces the amount of stress in the overall system by putting a majority of gear reduction in one area of the AIO printing device close to a roller shaft of the scanning system, so that PTO shaft does not have to transmit a large amount of torque. Still further, the PTO is able to transmit torque for the scanning system in a relatively smaller space than may be expected with a gear train that does not use the PTO.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1A is a block diagram of a printing device (100) including a drive selector system (150), according to one example of the principles described herein. A selectable drive printing device (100) includes a drive selector system (150) to select between driving a print drive system (105) and driving a scan drive system (160) based at least partially on a position of a selector swing arm (140) of the drive selector system (150). The selectable drive printing device (100) further includes a shifter (222) to selectively shift the drive selector system (150) between a scanning system drive position of the selector swing arm (140) and a printing system drive position of the selector swing arm (140).

Figure 1B:
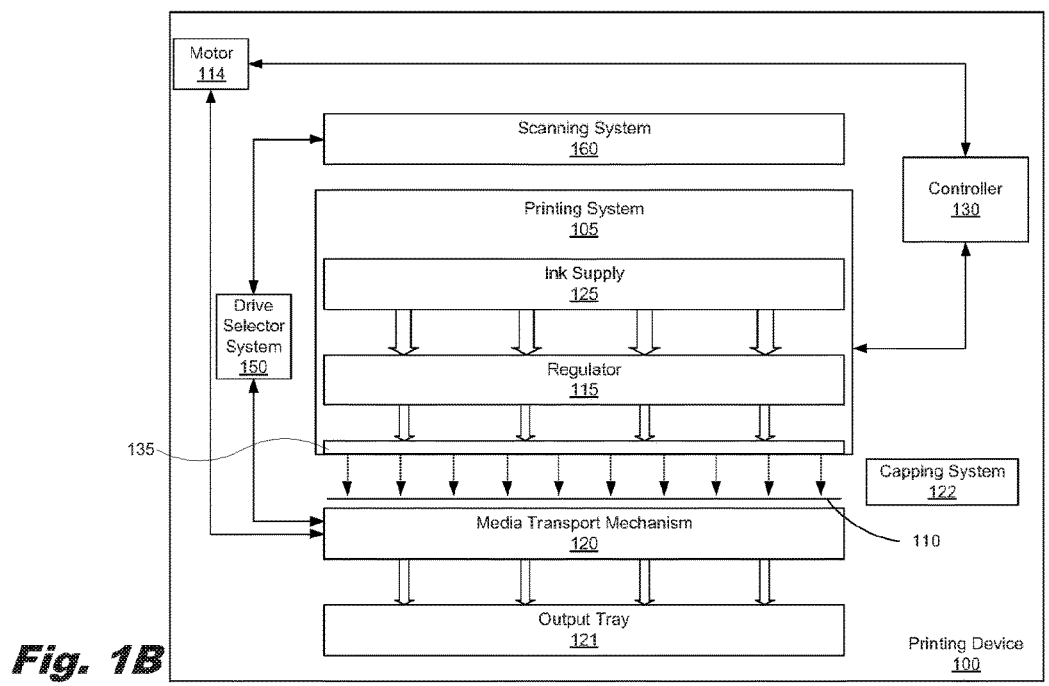
FIG. 1B is a block diagram of a printing device including a drive selector system, according to another example of the principles described herein.

FIG. 1B is a block diagram of a printing device (100) including a drive selector system (150), according to another example of the principles described herein. The printing device (100) may be any type of device that reproduces an image onto a sheet of print media. In one example, the printing device (100) may be an inkjet printing device, laser printing device, a toner-based printing device, a solid ink printing device, a dye-sublimation printing device, or a three-dimensional (3D) printing device, among others. Although the present printing device (100) is described herein as an inkjet printing device, any type of printing device may be used in connection with the described systems, devices, and methods described herein. Consequently, an inkjet printing device (100) as described in connection with the present specification is meant to be understood as an example and is not meant to be limiting.

The printing device (100) may include a number of subsystems that provide, for example, printing and scanning functionality. For example, the printing device (100) includes a printing system (105) that, in one example, includes a carriage moveably coupled to a carriage rail, and a number of printheads coupled to the carriage. In another example, the printing system (105) may include a number of page wide array printheads. In still another example, the printing system (105) may include a number of three-dimensional (3D) printheads used to build 3D objects. The printing system (105) of the printing device (100) may further include a number of flow regulators (115) associated with the printing system (105), and ink or other ejection fluid supplies (125).

The printing device (100) further includes a media transport mechanism (120) and a motor (114) to drive the media transport mechanism (120). The media transport mechanism (120) may transport media sheets from the printing device to the output tray (121) for collection, registration, and, in some examples, finishing of the media sheets. In one example, the media sheets collected in the output tray (121) include at least one media sheet on which the printing device (100) has produced text and/or images. In one example, a completed collection of media sheets may represent a print job that the printing device processes. Thus, the media transport mechanism (120) is used to transport print media through the printing device (100) during a print operation. The motor (114) also drives the drive selector system (150) and a scanner system (160) included in the printing device (100).

In one example, the motor (114) provides rotational movement to a feedshaft of the media transport mechanism (120), and indirectly drives the scanner drive system 160 via the feedshaft and the drive selector system (150).

The drive selector system (150), as will be described in more detail below, is a device that switches between a scanning system (160) drive position that causes the motor (114) to drive the scanning system (160), and a printing system (105) drive position. When the drive selector system (150) is switched to the printing system (105) drive position, it causes the motor (114) to drive the printing system (105) and a capping system (122) used to uncap the printheads (135) of the printing system (105). The mechanisms used to cause the motor (114) to drive the feedshaft of the media transport mechanism (120), and indirectly drive the scanner drive system (125), the printing system (105), and the capping system (122) via the feedshaft and the drive selector system (150) will be described in more detail below.

The capping system (122) is a device that humidically seals the nozzles, hermetically seals the nozzles, or combinations thereof of the printheads (135) from contaminants and drying when the printing system (105) is not being used to print images on print media (110) fed through the media transport mechanism (120). The scanning system (160) is any device that optically scans documents fed through the scanning system (160 to produce a digital image. Thus, in one example, the printing device is an all-in-one (AIO) printer/scanner that performs both document printing and document scanning functions.

The printing device (100) further includes a printer controller (130). The controller (130) may represent the programming, processor(s), associated data storage device(s), and the electronic circuitry and components used to control the operative elements of the printing device (100) including the firing and operation of the printheads (135) included in the printing system (105). Still further, the controller (130) controls functions of the motor (114) including, for example, the speed and duration of rotation of the motor (114) that is translated to the feedshaft of the media transport mechanism (120), the direction of rotation translated to the feedshaft of the media transport mechanism (120), the torque output by the motor (114), other functions of the motor, and combinations thereof.

By controlling the motor (114), the controller is able to indirectly control a number of systems within the printing device (100). For example, the controller (130) controls the media transport mechanism (120) used to transport media through the printing device (100) during printing and to transport the media sheets to the output tray (121). Further, the controller (130) controls functions of the scanning system (160), the printing system (105), and the capping system (122) by selectively engaging a shifter (222), a drive swing arm (108), a bearing (203) rotatably coupled to the drive swing arm (108), and other elements of the printing device (100). The controller (130) controls the scanning system (160), the printing system (105), and the capping system (122) by controlling the motor's (114) speed and duration of rotation, the direction of rotation translated, the torque output by the motor (114), other functions of the motor, and combinations thereof.

Throughout the figures, a three-dimensional Cartesian coordinate indicator (280) is depicted to orient the reader as to directions of movement and forces placed on and interaction between the various elements of the printing device (100). For example, the X-direction indicates a width of the printing device (100), the Y-direction indicates the depth of the printing device (100), and the Z-direction indicates the height of the printing device (100). Also, it is noted that throughout the figures, some elements of the printing device (100) may be removed from view in order to facilitate description of the depicted elements and to remove confusion regarding the elements of the printing device (100) described herein.

Figure 2:
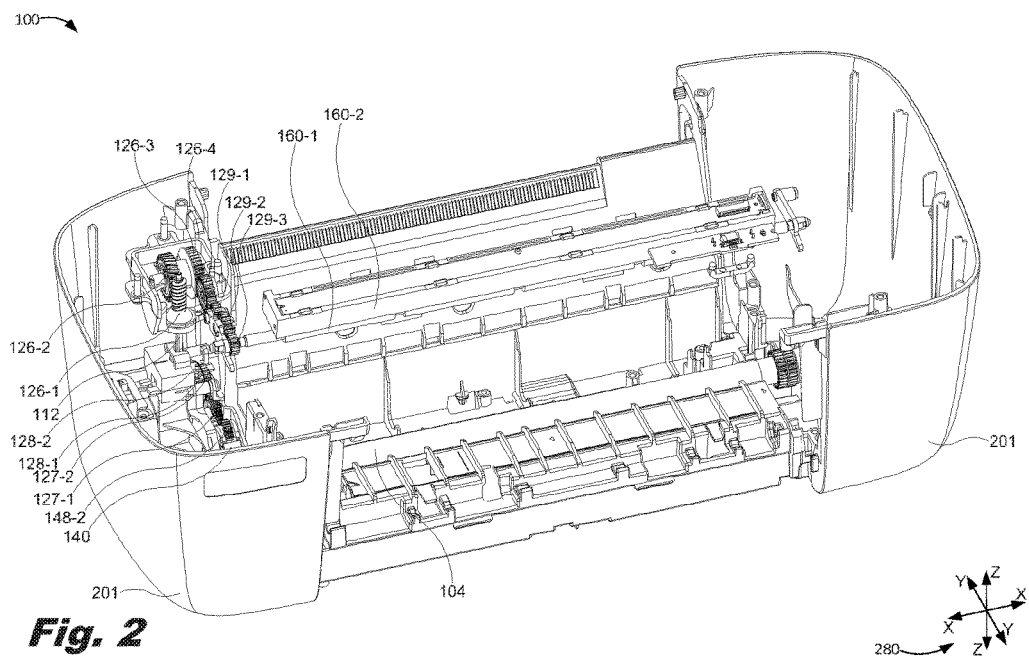
FIG. 2 is an isometric cutaway view of the printing device, according to one example of the principles described herein.
Figure 3:
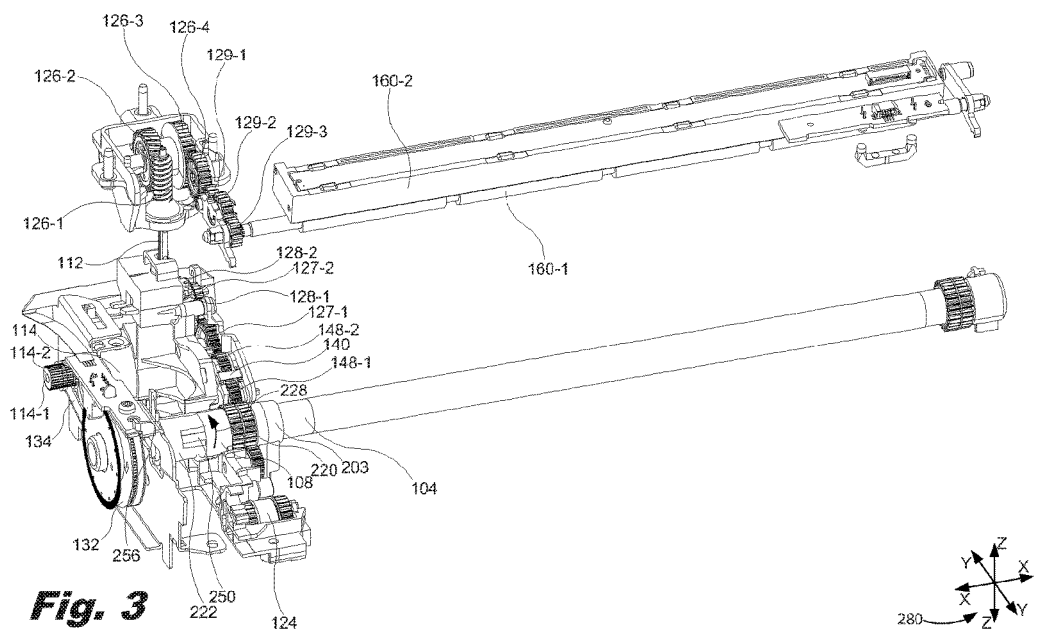
FIG. 3 is an isometric view of the drive system of the printing device including a scan drive system, according to one example of the principles described herein.

Turning now to FIGS. 2 and 3, FIG. 2 is an isometric cutaway view of the printing device (100), according to one example of the principles described herein. Further, FIG. 3, is an isometric view of the drive system of the printing device including a scan drive system, according to one example of the principles described herein. FIG. 2 depicts the printing device (100) with a portion of a housing (201) removed or cutaway to depict number of elements of the printing device (100). FIG. 3 depicts the elements of the printing device (100) included within the housing (201) depicted in FIG. 2. Reference will now be made to both FIGS. 2 and 3.

The printing device (100) includes a motor (114). The motor (114) includes a drive shaft (114-1) and a drive shaft gear (114-2). A toothed belt (134) is meshed with and coupled to the drive shaft gear (114-2) and a drive pulley (132). The drive pulley (132) is coupled to a feedshaft (104), and due to the rotation of the motor's (114) drive shaft (114-1) and drive shaft gear (114-2), and the resulting movement of the toothed belt (134) and rotation of the drive pulley (132), the feedshaft (104) rotates. In one example, if the motor (114) rotates in a reverse direction, the feedshaft (104) rotates clockwise relative to the views of the feedshaft (104) in, for example, FIGS. 4-7. If the motor (114) rotates in a forward direction, the feedshaft (104) rotates counter clockwise relative to the views of the feedshaft (104) in, for example, FIGS. 4-7. In one example, the motor (114) provides sufficient torque to drive the components of the printing device (100) and components connected to the printing device (100).

The feedshaft (104) is used to impart rotational movement to the printing system (105). This rotational movement causes the printing device (100) to feed sheets of print media through the printing device (100) in the Y-direction, engages and disengages the capping system (122), and causes the printing device (100) to feed documents through the scanning system (160) to create digital representations of the documents.

The feedshaft (104) includes a number of elements fixedly coupled and rotatably coupled to the feedshaft (104). Feedshaft drive gears (220) are formed in or coupled to the feedshaft (104) and move with the feedshaft (104) as the feedshaft (104) turns. Further, a drive swing arm (108) and a bearing (203) are rotatably coupled to the feedshaft (104) such that the feedshaft (104) rotates and the drive swing arm (108) and a bearing (203) do not rotate with the feedshaft (104). Thus, the drive swing arm (108) and a bearing (203) are coupled to the feedshaft (104) but allowed to rotate independent of the rotation of feedshaft (104).

A shifter (222) is rotatably coupled to the feedshaft (104) such that the shifter (222) is free to rotate about the feedshaft (104). The shifter (222) includes a friction finger (250) formed therein. The friction finger (250) creates an amount of drag on the feedshaft (104). This drag produced by the friction finger (250) ensures that the shifter (222) biases itself in the direction of rotation of the feedshaft (104). In this manner, the shifter (222) is able to be repositioned and selectively engage and disengage with the drive swing arm (108) based on a direction of rotation of the feedshaft (104). It is noted that the direction of rotation of the feedshaft (104) is based on the direction of rotation of the motor (114), and that the direction of rotation of the motor (114) is based on the signals received from the controller (130).

The shifter (222) either places the printing device (100) in a printing and uncapped state or in a scanning and capped state based on the direction of rotation of the feedshaft (104). Here, "capped state" refers to the capping system (122) capping the printheads (135) of the printing system (105), and "uncapped state" refers to the capping system (122) disengaging the caps (271) from the printheads (135). Thus, the shifter (222) is the device within the printing device (100) that causes, at least partially, the printing device to be either in a scanning system (160) drive position that causes the motor (114) to drive the scanning system (160), or a printing system (105) drive position that causes the motor (114) to drive the printing system (105).

In one example, the capping system (122) caps the printheads (135) of the printing device (100) when the shifter (222) is in the scanning system (160) drive position and uncaps the printheads (135) of the printing device (100) prior to when the shifter (222) transitions to the printing system (105) drive position to allow the printheads of to be used by the printing system (105). Further, the shifter (222) is influenced by the positioning of other components within the printing device (100). For example, a carriage used to carry the printheads (135) as they eject printing fluid prevents the shifter (222) from over rotating about the feedshaft (104) when the shifter (222) is in a scanning system drive position. In this state, a rack (FIGS. 4 and 5, 118) is in a scan position as well, and the printheads (135) are capped. Conversely, when the rack (FIGS. 4 and 5, 118) is in an uncapped position, the printheads (135) are uncapped, and the shifter (222) is oriented in a printing system drive position. More information regarding the interaction between the function of the shifter (222), the rack (118), and the capping system (122) is described below.

A drive selector system (150) and a scan drive system of the printing device (100) will now be described in connection with the feedshaft (104). The feedshaft (104), driven by the motor (114), provides rotational power and torque to both the printing system (105) and the scanning system (160). However, selection of which of the printing system (105) and the scanning system (160) to drive is at least partially based on the position of a selector swing arm (140). A feedshaft drive gear (220) formed on or coupled to the feedshaft (104) meshes with the first selector gear (148-1). In one example, the feedshaft drive gear (220) is continually meshed with the first selector gear (148-1) during all operation states of the printing device (100).

Figure 7:
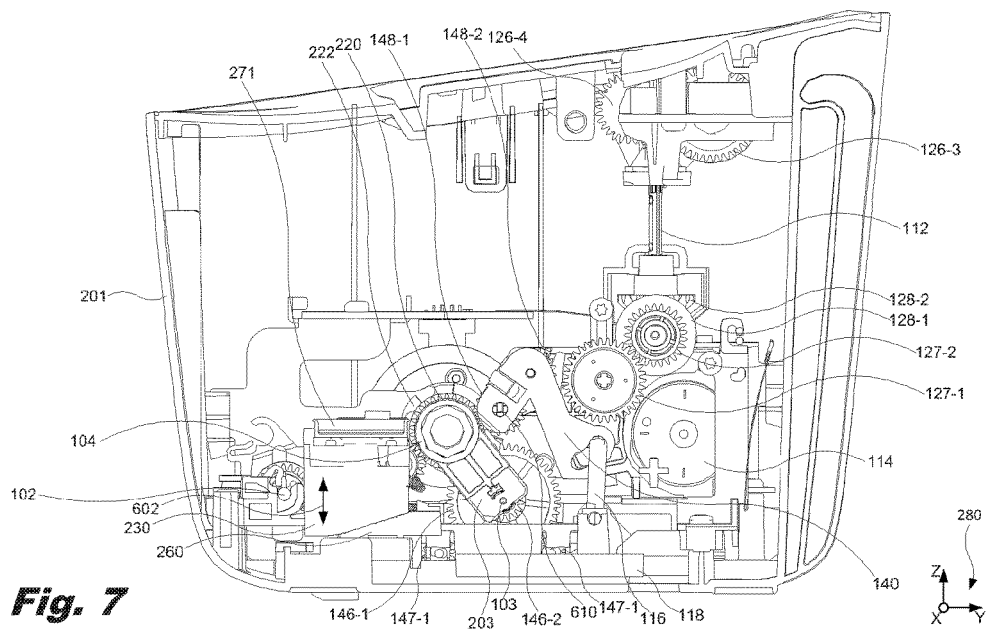
FIG. 7 is a side cutaway view of the printing device with a scan drive of the printing device disengaged, according to one example of the principles described herein.
Figure 8:
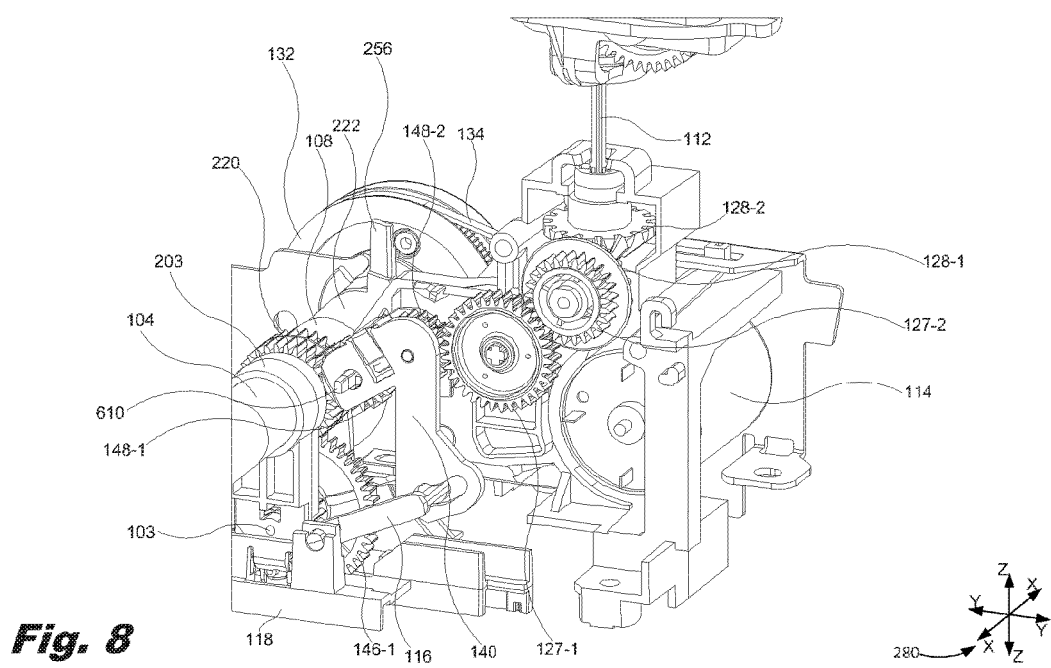
FIG. 8 is a partially cutaway, isometric view of the printing device with a scan drive of the printing device engaged, according to one example of the principles described herein.
Figure 9:
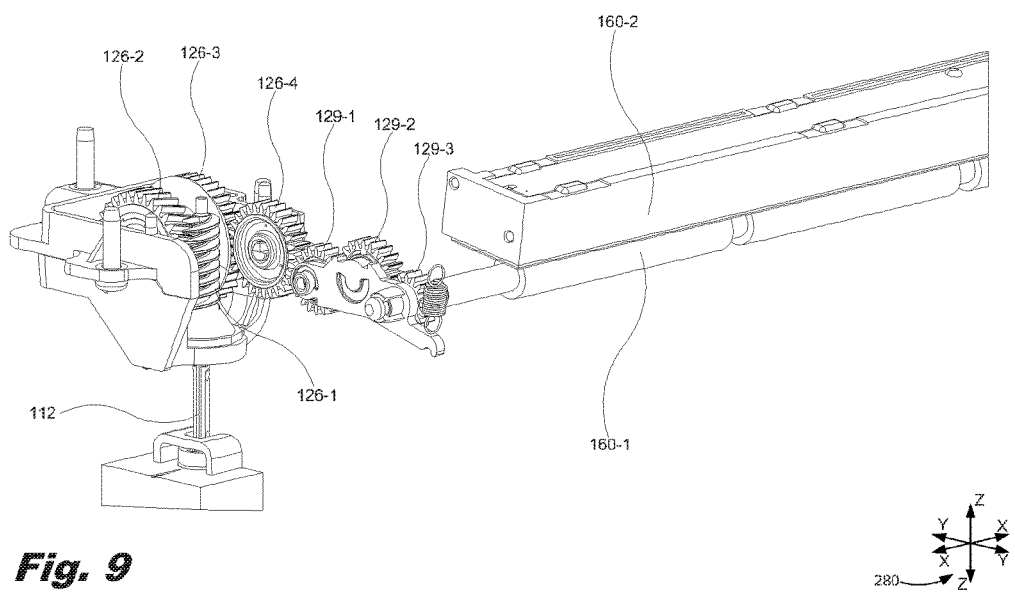
FIG. 9 is an isometric view of the scan drive system of FIG. 5, according to one example of the principles described herein.

In FIGS. 2 and 3, as well as FIGS. 7 and 8, the selector swing arm (140) is in a scanning drive position. In this position, the teeth of the second selector gear (148-2), being engaged with the first selector gear (148-1) and driven by the feedshaft drive gear (220), engage with the teeth of the a first intermediate gear (127-1) and the remaining movement components of the scanning system (160). The components of the scanning system (160) will now be described in the order at which movement and torque is imparted.

Specifically, the first intermediate gear (127-1) meshes with a second intermediate gear (127-2) formed on the first bevel gear (128-1). In the example of FIGS. 2 and 3, the system includes two intermediate gears (127-1, 127-2) in order to maintain an intended direction of rotation and to adjust torque and gear ratios. However, any number of intermediate gears may be employed.

The second intermediate gear (127-2) may be formed with or otherwise coupled to a first bevel gear (128-1). In this manner, the second intermediate gear (127-2) and the first bevel gear (128-1) form a gear cluster. A gear cluster is any assembly of gears permanently attached to a shaft or formed as a monolithic set with a common axis. The second intermediate gear (127-2) formed on the first bevel gear (128-1) being meshed with the first intermediate gear (127-1) is caused to rotate. This actuates the first bevel gear (128-1) portion of the combination of the second intermediate gear (127-2) and first bevel gear (128-2). The first bevel gear (128-1) meshes with the second bevel gear (128-2).

Again, the movement of the intermediate gears (127-1, 127-2) and the bevel gears (128-1, 128-2) are effected by rotation of the feedshaft (104) when the selector swing arm (140) is in a scanning drive position. As a result, the motor (114) is able to drive the components of the scanning system (160) via the feedshaft (104) and the selector swing arm (140). In contrast, the intermediate gears (127-1, 127-2) and the bevel gears (128-1, 128-2) of the scanning system (160) disengage from the feedshaft drive gear (220) of the feedshaft (104) when the second selector gear (148-2) of the selector swing arm (140) is disengaged from the first intermediate gear (127-1). As will now be described in more detail, this state also includes the rack (118) of the drive selector system (150) being in an uncapped position.

Figure 4:
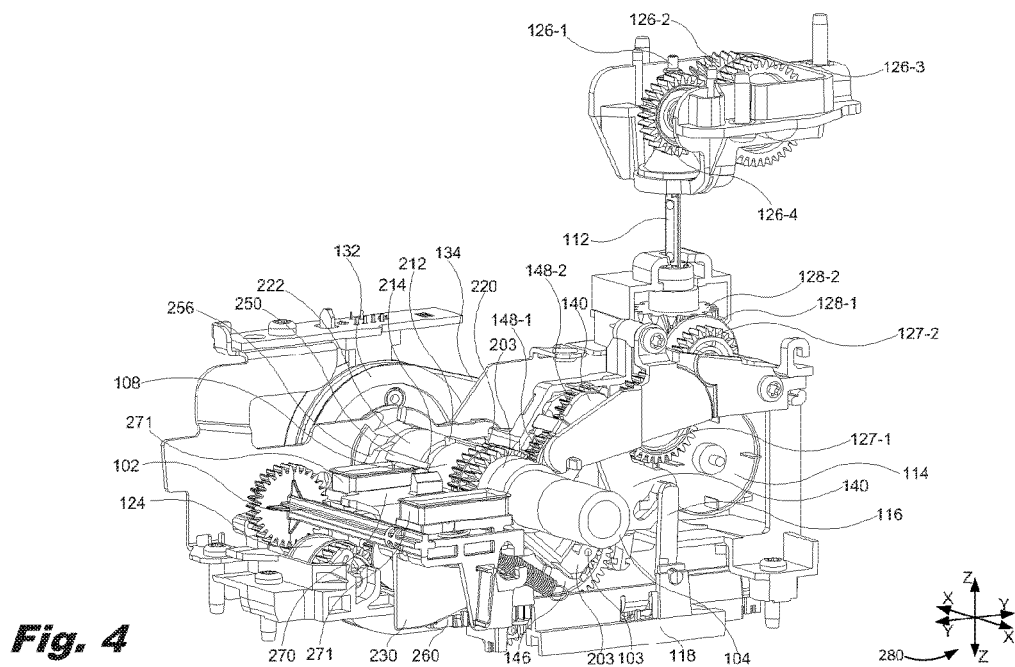
FIG. 4 is a partially cutaway, isometric view of a drive system of the printing device, according to one example of the principles described herein.
Figure 5:
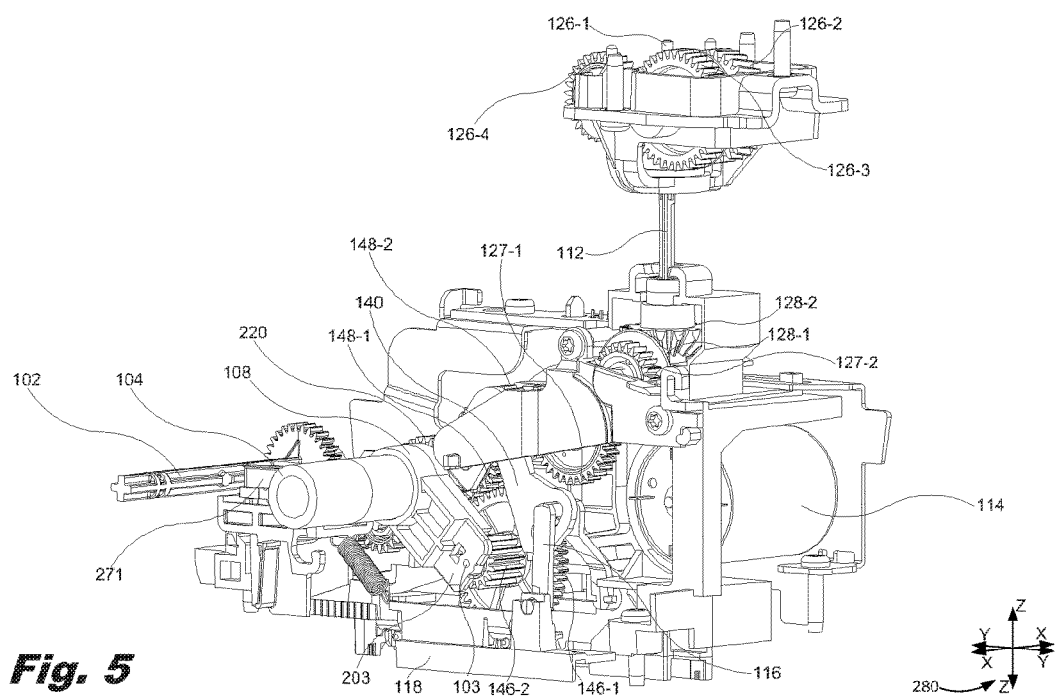
FIG. 5 is a partially cutaway, isometric view of a drive system of the printing device, according to one example of the principles described herein.
Figure 6:
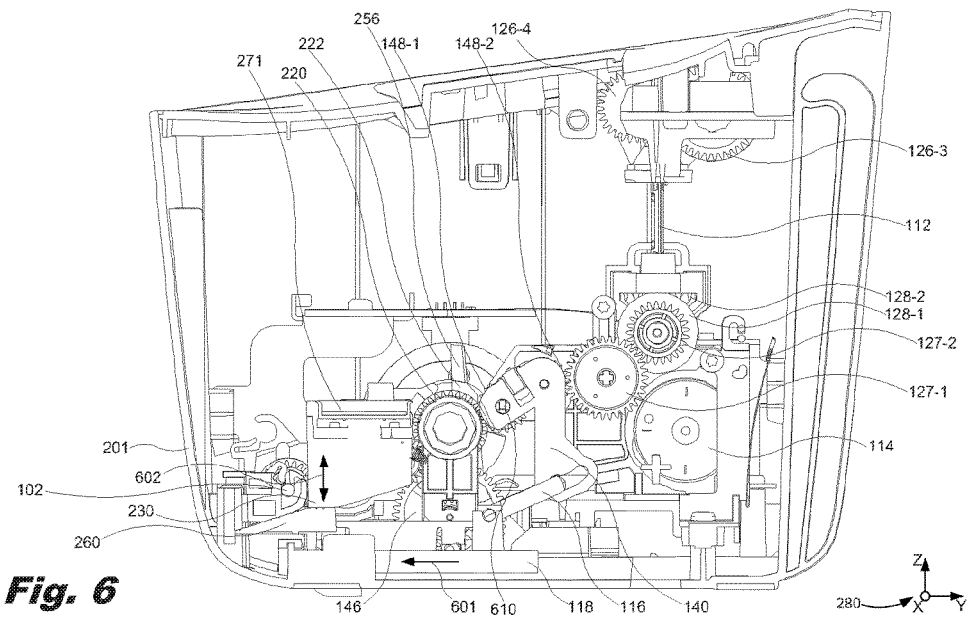
FIG. 6 is a side cutaway view of the printing device with a scan drive of the printing device engaged, according to one example of the principles described herein.

The pivoting movement of the selector swing arm (140) and the lateral movement of the rack (118) will now be described in connection with FIGS. 4 through 7. FIG. 4 is a partially cutaway, isometric view of a drive system of the printing device (100), according to one example of the principles described herein. Further, FIG. 5 is a partially cutaway, isometric view of a drive system of the printing device (100), according to one example of the principles described herein. FIGS. 4 and 5 are two different perspectives of the drive system of the printing device (100). Further, FIG. 6 is a side cutaway view of the printing device (100) with a scan drive of the printing device (100) engaged, according to one example of the principles described herein. In contrast, FIG. 7 is a side cutaway view of the printing device (100) with the scan drive of the printing device (100) disengaged, according to one example of the principles described herein.

The disengagement of the second selector gear (148-2) of the selector swing arm (140) from the first intermediate gear (127-1) to cause the printing device (100) to stop driving the scanning system (100) is brought about via the interaction between the shifter (222), the drive swing arm (108), and the bearing (203) coupled to the drive swing arm (108). Specifically, the shifter (222) includes a shifter interface (FIG. 4, 214) that selectively interfaces with a swing arm interface (FIG. 4, 212) of the drive swing arm (108) as depicted in, for example, FIG. 4. As depicted in, for example, FIG. 3, the arm (256) of the shifter (222) is in an up position which indicates that the shifter interface (FIG. 4, 214) is interfacing with the swing arm interface (FIG. 4, 212) of the drive swing arm (108), and causing the drive swing arm (108) to move to and remain in a position as indicated by arrow 228 in FIG. 3. Thus, the shifter (222) interfaces with the drive swing arm (108) as the feedshaft (104) rotates in the same direction as arrow 228 as depicted in FIG. 3.

The drive swing arm (108) is coupled to the bearing (203) via, for example a swing arm rod (FIGS. 4 and 5, 103). In this manner, the drive swing arm (108) and the bearing (203) move together as they rotate about the feedshaft (104) based on the interaction between the shifter (222) and the drive swing arm (108).

The drive swing arm (108) and the bearing (203) move together since they are coupled together via the swing arm rod (103). In one example, if the drive swing arm (108) rotates counter clockwise as a result of the interface between the shifter (222) and the drive swing arm (108), the bearing (203) rotates counter clockwise with the drive swing arm (108). Conversely, if the drive swing arm (108) rotates clockwise as a result of the disengagement of the interface between the shifter (222) and the drive swing arm (108), the bearing (203) rotates clockwise.

This, in turn, allows the drive swing arm (108) to swing between two positions such that the cluster gears (FIGS. 4 and 5, 146-1, 146-2) can engage or disengaged from teeth defined in the rack (118). Specifically, the cluster gear (146) is coupled to the swing arm rod (103) between the drive swing arm (108) and the bearing (203), and includes a first cluster gear (146-1) and a second cluster gear (146-2) as depicted in FIGS. 5 and 7, for example. The first cluster gear (146-1) is larger than the second cluster gear (146-2). Further, the first cluster gear (146-1) is connected to the second cluster gear (146-2) on either a common shaft, or as a monolithic set. The teeth of the first cluster gear (146-1) engage with teeth of the feedshaft drive gear (220). As a result, as the feedshaft drive gear (220) rotates, the rotational motion is transferred to the first cluster gear (146-1). The second cluster gear (146-2) engages or disengages with the teeth of the rack (118) depending on the position of the drive swing arm (108). When the second cluster gear (146-2) engages with the rack (118), the rotational motion of the second cluster gear (146-2) is transferred to a linear motion of the rack (118). As a result, the rack (118) moves laterally between the scanning system (160) drive position that causes the feedshaft (104) to drive the scanning system (160), and the printing system (105) drive position that causes the feedshaft (104) to drive the printing system (105). The difference between the scanning system (160) drive position and the printing system (105) drive position is depicted in FIGS. 6 and 7, respectively. As mentioned above, the scanning position includes the printing device (100) being in a capped position wherein the capping system is engaged with the printheads (135). Further, the printing position includes the printing device (100) being in an uncapped position wherein the capping system is not engaged with the printheads (135).

With the understanding of how the cluster gear (146) moves the rack (118), the drive selector system (150) includes a connector arm (116). The connector arm (116) is pivotally connected to the rack (118) and to the selector swing arm (140). As the position of the rack (118) changes, the position of the connector arm (116) changes. For example, when the rack (118) is in the scanning system (160) drive position as depicted in, for example, FIGS. 6 and 8, the connector arm (116) is in a relatively horizontal position. This causes the selector swing arm (140) to pivot about an axis (610) on which the selector swing arm (140) is coupled. With this pivoting about the axis, (610), the selector swing arm (140) places the printing device (100) in the scanning system (160) drive position and causes the second selector gear (148-2) to mesh with the first intermediate gear (127-1). With the second selector gear (148-2) engaged with the first intermediate gear (127-1), the rotation of the feedshaft drive gear (220) coupled to the feedshaft (104) imparts rotational movement to the first intermediate gear (127-1) and the remainder of the scanning system (160).

In contrast, when the rack (118) is in the printing system (105) drive position, as depicted in, for example, FIGS. 4, 5, and 7, the connector arm (116) is in a relatively vertical position. This pivots the selector swing arm (140) about the axis (610) to the printing system (105) drive position, and causes the second selector gear (148-2) to disengaged from the first intermediate gear (127-1). In this state, the first selector gear (148-1) and the second selector gear (148-2) are in neutral and simply rotate without transmitting movement or torque to any other portion of the printing device (100). Thus, as the position of the connector arm (116) changes, the selector gears (148-1, 148-2) of the selector swing arm (140) engage or disengage with the scanning system (160).

The printing device (100) as described thus far is a compact design that uses a single motor to drive components of a scanning system (160), components to cap and uncap printheads (135) using the capping system (122) of the printing device (100), and drive components of the printing system (105). As a result, by eliminating a dedicated motor to drive components of the scanning system (160) and another motor to drive components of a capping system (122), and instead using a single motor to drive for the scanning system (160), the capping system (122), and the printing system (105), the overall size, weight, and cost of the printing device (100) is significantly reduced. In one example, the overall size of the printing device is reduced by approximately 35 millimeters (mm). Further, the reduction in manufacturing cost of the printing device (100) may be approximately $1.00 U.S. dollar or more.

Thus, the printing device (100) includes a capping system (122), a scanning system (160), and a drive selector system (150). The drive selector system (150) includes a number of components including the shifter (222), the bearing (203), the drive swing arm (108), and selector swing arm (140) as described above. Further, the controller (130) and the motor (114) serve to rotate the feedshaft (104) in either direction to influence the function and position of the shifter (222), the bearing (203), the drive swing arm (108), and selector swing arm (140), and, in this manner, may also be considered part of the drive selector system (150). The printing device (100) uses a single motor (114) to drive all these systems.

Turning again to the scanning system (160), the shifter (222), the bearing (203), the drive swing arm (108) of the drive selector system (150) cause the selector swing arm (140) to engage or disengage the scanning system (160) from the feedshaft. The scanning system (160) includes a number of components including, in order of transmitted torque, the first and second intermediate gears (127-1, 127-2), and the first and second bevel gears (128-1, 128-2) described above. The scanning system (160) further includes a PTO shaft (112), a worm (126-1) and a worm gear (126-2) forming a worm gear set, third and fourth intermediate gears (126-3, 126-4), fifth and sixth intermediate gears (129-1, 129-2), and a scan roller gear (129-3) coupled to a scan roller (160-1). The scanning system (160) further comprises an optical scanning device (160-2) to scan documents by the scan roller (160-1).

In one example, the PTO shaft (112) is used to connect the set of bevel gears (128-1, 128-2) and the worm (126-1) to each other. As mentioned above, the first bevel gear (128-1) and the second bevel gear (128-2) are set perpendicular to bring about a 90-degree transfer of motion from the X- and Y-direction to the Z-direction so that the torque is transferred in an upward direction. As a result, the teeth on the first bevel gear (128-1) and the teeth on the second bevel gear (128-2) are designed to engage with each other at a 90-degree angle. This transfers the motion in the Z-direction relative to the X- and Y-directions. The second bevel gear (128-2) is coupled to or formed with a first end of the PTO shaft (112).

The PTO shaft (112) drives the worm drive (110) depicted in, for example, FIGS. 2-7 and 9. In more detail, the PTO shaft (112) is coupled to or formed with the worm (126-1). The worm (126-1) and a meshing worm gear (126-2) are set perpendicular to each other. As a result, the teeth on the worm (126-1) and the teeth on the worm gear (126-2) are designed to engage with each other at a 90-degree angle. This allows the worm gear (126-2) to rotate as the worm (126-1) rotates and provides a 90-degree transfer of motion in the plan based on the Cartesian coordinate indicator (280). The worm gear (126-2) is axially connected to or formed with a third intermediate gear (126-3). As a result, as the worm gear (126-2) rotates, the third intermediate gear (126-3) rotates in the same rotational direction. The third intermediate gear (126-3) meshes with a fourth intermediate gear (126-4), and the fourth intermediate gear (126-4) is used to drive a number of components of the scanning device including, for example, the fifth and sixth intermediate gears (129-1, 129-2), and the scan roller gear (129-3) coupled to the scan roller (160-1).

The bevel gears (128) of the scanning system (160) engage with the feedshaft drive gear (220) of the feedshaft (104) when the rack (118) of the of the drive selector system (150) is in a scanning system (160) drive position designed by arrow 601 of FIG. 6, for example. A second selector gear (148-2) rotatably coupled to the selector swing arm (140) is meshed with the first intermediate gear (127-1) when the drive selector system (150) is positioned in the scan position. A first selector gear (148-1) is remains meshed with the feedshaft drive gear (220) when the selector swing arm (140) is in any position including the capped and scan position and the uncapped and printing position. The teeth of the bevel gears (128) engage with teeth of selector gears (148-1, 148-2) of a selector swing arm (140) when the rack (118) of the drive selector system (150) is in the scan position. As depicted in FIG. 6 for example, with the rack (118) in the scan position, the selector swing arm (140) is in a scanning drive position. Further, the teeth of the first selector gear (148-1) engage with the teeth of the feedshaft drive gear (220) as well as the first intermediate gear (127-1). The first intermediate gear (127-1) meshes with a second intermediate gear (127-2) formed on the first bevel gear (128-1). In this manner, the second intermediate gear (127-2) and the first bevel gear (128-1) form a gear cluster. A gear cluster is any assembly of gears permanently attached to a shaft or formed from as a monolithic set with a common axis.

The second intermediate gear (127-2) formed on the first bevel gear (128-1) being meshed with the first intermediate gear (127-1) is caused to rotate. This actuates the first bevel gear (128-1) portion of the combination of the second intermediate gear (127-2) and first bevel gear (128-2). The first bevel gear (128-1) meshes with the second bevel gear (128-2). Again, the movement of the intermediate gears (127-1, 127-2) and the bevel gears (128) are cause by rotation of the feedshaft (104) when the rack (118) of the drive selector system (150) is in the scanning system (160) drive position as depicted in FIGS. 3, 6, and 8. In contrast, the first intermediate gear (127-1) and the remainder of the gears within the scanning system (160) disengage from the feedshaft drive gear (220) of the feedshaft (104) when the rack (118) of the drive selector system (150) is in a printing system (105) drive position. For example, the teeth of the first intermediate gear (127-1) disengages from the teeth of the second selector gear (148-2) when the rack (118) of the drive selector system (150) is in the printing system (105) drive position as depicted in, for example, FIGS. 4, 5, and 7. With the rack (118) in the printing system (105) drive position, the selector swing arm (140) is pivoted about the axis (610) on which the selector swing arm (140) is coupled. In this state, arm (256) of the shifter (222) is in a down position which indicates that the shifter interface (FIG. 4, 214) is not interfacing with the swing arm interface (FIG. 4, 212) of the drive swing arm (108). Instead, the drive swing arm (108) is allowed to move to and remain in a position opposite the direction indicated by arrow 228 in FIG. 3. As described above, the drive swing arm (108) and the bearing (203) move together since they are coupled together via the swing arm rod (103). This, in turn, allows the feedshaft drive gear (220) to rotate as the feedshaft (104) rotates, and transfer the rotational motion to the first cluster gear (146-1). The second cluster gear (146-2) again engages with the teeth of the rack (118), and the rotational motion of the second cluster gear (146-2) is transferred to a linear motion of the rack (118) in the direction opposite the direction of arrow 601 depicted in FIG. 6. As a result, the rack (118) moves laterally between the scanning system (160) drive position that causes the feedshaft (104) to drive the scanning system (160), to the printing system (105) drive position. As a result, the motor (114) is not able to drive the scanning system (160) and, in turn, the components of the scanning device, due to the disengagement of the selector swing arm (140) from the connector arm (116) pivotably coupled to the rack (118) pushing the selector swing arm (140) out of disengagement with the first intermediate gear (127-1) as depicted in, for example, FIGS. 4, 5, and 7.

Turning now to additional components of the printing device (100) other than the scanning system (160), the printing device (100) also includes an output shaft (102). The output shaft (102) is used to drive the printing media out of the printing device (100) in the Y-direction and into, for example, the output tray (121) at the last stage of printing. The output shaft (102) is connected to and driven by the feedshaft (104) via a one-way clutch (124). The one-way clutch is driven by the feedshaft drive gear (220). The one-way clutch (124) engages the output shaft (102) when the feedshaft (104) rotates in one direction. However, the one-way clutch (124) does not engage the output shaft (102) when the feedshaft rotates in an opposite direction. For example, if the feedshaft (104) rotates counter-clockwise as depicted in, for example FIGS. 6 and 7, the output shaft (102) also rotates counter-clockwise to output the print media. However, if the feedshaft (104) rotates clockwise, the output shaft (102) does not rotate. It is noted that the rotational direction of the feedshaft (104) and effected rotation of the output shaft (102) may be in any direction that brings about the ejection of print media. With this understanding, the print media moves away from the printing device such that print media is ejected from the printing device during a printing operation, and the output shaft (102) does not allow the print media to move back into the printing device (100).

In some examples, printing devices have an output drive system, such as the output shaft (102) and the one-way clutch (124), located in relatively different locations in the printing device than other components of the printing device. However, the components of the printing device (100) of the examples described herein, including the capping system (122), are located in relatively the same location as the output drive system. In other printing devices, since space is limited, a capping system (122) that can move up and down, side to side, and back and forth, cannot be used with the printing device (100) in proximity to the output drive system. However, examples described herein provide the capping system (122) that moves up and down as described above. This allows the capping system (122) and the output system to be located in relatively the same location within the printing device or juxtaposition one another as described herein.

Further, with reference to FIGS. 4-7, the printing device (100) includes a capping system (122). The capping system (122) is used to cap and humidically seal a number of printheads coupled to a carriage that provides motion of the printheads in the X-direction. The capping system (122) includes at least a portion of the rack (118). In this manner, the motion of the rack (118) as described herein effects the capping and uncapping of the capping system (122) relative to the printheads. The rack (118) includes a ramp (260) formed therein that interfaces with an elevator (230) formed in the capping body (270).

As depicted throughout the figures, the capping system (122) is located underneath other components of the printing device (100). For example, the capping system (122) is located underneath the feedshaft (104) and the output shaft (102). Due to the design of the capping system (122) and its proximity to the other components. The capping system (122) is able to travel up and down as described above without interfering with the operation of other components.

The capping system (122) further includes a number of caps (271) formed on the capping body (270). In one example, the number of caps (271) is equal to the number of printheads (135) that may be coupled to the carriage. The ramp (260) formed on the rack (118) of the capping system (122) moves the elevator (230). For example, the elevator (230) moves in a vertical direction as indicated by arrow 602 in FIGS. 6 and 7 as the rack (118) and its ramp (260) move in a horizontal direction as indicated by arrow 601.

The printing device (100) is in a printing system (105) drive position as depicted in FIGS. 4 and 7. Further, the shifter (222) is in a clear position. In the clear position, the arm (256) of the shifter (222) rotates from an up, scanning system (160) drive position to the clear position when the feedshaft (104) rotates counter-clockwise as depicted in FIG. 7. In the clear position, the arm (256) of the shifter (222) does not interface with a carriage. As a result, the carriage is free to move in the X-direction along the carriage rail to which it is coupled.

Once the printing device (100) has finished a print job, the printheads of the printing device (100) are capped in order to humidically seal the nozzles of the printheads from contaminants and drying when the printing device is not being used to print images on print media. In one example, the feedshaft (104) rotates clockwise relative to the view depicted in FIGS. 6 and 7. This moves the shifter (222) to a scanning system (160) drive position. In the scanning system (160) drive position, the drive arm interface (212) interfaces with the shifter interface (214). This causes the drive swing arm (108) and the bearing (203) to swing clockwise relative to the view depicted in FIGS. 6 and 7. The cluster gears (146) rotatably coupled to the drive swing arm (108) engage with the rack (118) when the rack (118) is in the uncapped position as depicted in FIG. 7.

The second cluster gear (146-2) as depicted in FIGS. 6 and 7 is depicted as being meshed with a first idler gear (147-1) that is rotatably coupled to a portion of the rack (118) on the left or in the negative X-direction. An idler gear is any gear that does not drive a shaft to perform any work. In the case of the first idler gear (147-1), its function is to allow the second cluster gear (146-2) to idle after a transition of the rack (118) from the left to the right as depicted in the transition between FIG. 7 to FIG. 6. In one example, the cluster gear (146) will stop spinning due to friction between different positions of the rack (118).

In preparing to cap the printheads coupled to the carriage, the friction finger (250) biases the shifter (222) to rotate in the same direction as the rotation of the feedshaft (104). As mentioned above, the friction finger (250) creates an amount of drag on the feedshaft (104). This drag produced by the friction finger (250) ensures that the shifter (222) always biases itself in the direction of rotation of the feedshaft (104). In this manner, the shifter (222) is able to be repositioned and selectively engage and disengage with the drive swing arm (108) based on a direction of rotation of the feedshaft (104). It is noted that the direction of rotation of the feedshaft (104) is based on the direction of rotation of the motor (114), and that the direction of rotation of the motor (114) is based on the signals received from the controller (130).

The shifter (222) rotates with the feedshaft (104) until it interfaces with a portion of the printing device (100) including, for example, the carriage or the capping body (270). Once the shifter (222) interfaces with the carriage or the capping body (270), the rotation of the feedshaft (104) is such that the drag created by the friction device (230) is overcome. As a result, the feedshaft (104) can still rotate while the shifter (222) is restricted from over-rotating, or rotating past a desired or defined point.

In this example, as the feedshaft (104) rotates clockwise relative to the view depicted in FIGS. 6 and 7, the friction finger (250) creates the drag. As a result, the shifter (222) rotates clockwise due to the drag until the arm (256) of the shifter (222) is in an upright position as indicated by the upwards Z-direction. In one example, the arm (256) of the shifter (222) interfaces with a first portion (257) of the framework of the printing device (100). Once the shifter (222) is in the upright position, the shifter (222) is in the scanning system (160) drive position as depicted in FIGS. 6 and 8. In another example, as the feedshaft (104) rotates counter clockwise, the friction finger (250) again creates drag against the feedshaft (104). As a result, the shifter (222) rotates counter clockwise due to the drag until the arm (256) of the shifter (222) interfaces with the capping body (270). Further, the carriage (206) is moved by the printing device (100) in order to allow the shifter (222) to rotate to the clear position. Once the shifter (222) rotates and interfaces with the capping body (270), for example, as depicted in FIGS. 4, 5, and 7, the shifter (222) is in the clear position. As described herein, in the clear position, the arm (256) of the shifter (222) rotates from an up, scanning system (160) drive position to the clear position (i.e., the printing system drive position) when the feedshaft (104) rotates counter-clockwise as depicted in, for example, FIGS. 4, 5, and 7. In the clear position, the arm (256) of the shifter (222) does not interface with a carriage. As a result, the carriage is free to move in the X-direction along the carriage rail to which it is coupled.

The cluster gears (146-1, 146-2) drive the rack (118) from the uncapped position to the capped and scan position. Now that the shifter (222) is blocked by the carriage (206) or other element within the printing device (100), the swing arm interface (212) and the shifter interface (214) interface with each other. Further, the shifter (222) remains in the upright position. This causes the drive swing arm (108) to engage with the first intermediate gear (127-1). As a result, the feedshaft (104) can rotate without the drive swing arm (108) rotating. To cap the printheads, the feedshaft (104) rotates counter clockwise relative to the view depicted in FIGS. 6 and 7. As mentioned above, the feedshaft drive gear (220) engages with the cluster gears (146). Since the feedshaft is rotating counter clockwise, the cluster gears (146) rotate clockwise relative to the view depicted in FIGS. 6 and 7. The teeth of the cluster gears (146) engage with the teeth of the rack (118). As the cluster gear (146) engages with the rack (118), the rack (118) moves, as indicated by arrow 601, from the uncapped position of FIG. 7 to the capped and scan position of FIG. 6. The ramp (260) interfaces with the elevator (230), and forces the capping body (270) in an upward direction as indicated by arrow 602 and the positive Z-direction. Thus, as the rack (118) transitions from the uncapped position to the capped and scanning system (160) drive position, the ramp (260) is pushed underneath the elevator (230). This results in the elevator (230) moving upwards in the positive Z-direction. When the elevator (230)

is moved upwards, the elevator (230) presses a number of caps (271) against the printheads. The caps (271), being made of an elastomeric material, are compressed against the printheads to provide a seal. As a result, the caps (271) protect the printheads from drying out, from contamination, or combinations thereof.

Conversely, as the rack (118) transitions from the capped and scanning system (160) drive position to the uncapped and printing system (105) drive position, the ramp (260) is removed from underneath the elevator (230). This results in the elevator (230) causing the capping body (270) to move downwards. When the capping body (270) is moved down, the caps (271) of the capping body (270) do not press against the printheads. Since the caps (271) do not push against the printheads, the printheads are uncapped. As a result, the printheads may be used for a print job. In one example, the capping body (270) moves downward at least a distance to allow for the carriage and its printheads to clear the capping body (270) during a printing process.

In preparing to uncap, the cluster gears (146-1, 146-2) drive the rack (118) from the capped and scanning system (160) drive position to the uncapped and printing system (105) drive position. As the feedshaft (104) rotates clockwise relative to the view depicted in FIGS. 6 and 7, the swing arm interface (212) and the shifter interface (214) separate from one another. This causes the drive swing arm (108) to rotate clock wise. As mentioned above, the feedshaft drive gear (220) engages with the cluster gears (146). In FIG. 6, the second cluster gear (146-2) is meshed with a second idler gear (147-2) after the rack (118) moved to the left as indicated in by arrow 601. Since the feedshaft (104) is rotating clockwise, the cluster gear (146) is caused rotate counter-clockwise.

The specification and figures describe a selectable drive printing device. The selectable drive printing device includes a drive selector system to select between driving a print drive system and driving a scan drive system based at least partially on a position of a selector swing arm of the drive selector system, and a shifter to selectively shift the drive selector system between a scanning system drive position of the selector swing arm and a printing system drive position of the selector swing arm.

This selectable drive printing device (1) provides for a printing device that costs less to manufacture and reduces costs to consumers; (2) uses fewer motors reducing the use of resources; and (3) provides for a printing device that has a smaller footprint and weighs less, among other characteristics.

The preceding description has been presented to illustrate and describe examples of the principles described. This description is not intended to be exhaustive or to limit these principles to any precise form disclosed. Many modifications and variations are possible in light of the above teaching.

What is claimed is:

1. A selectable drive printing device comprising:
   a drive selector system to select between driving a print drive system and driving a scan drive system based at least partially on a position of a selector swing arm of the drive selector system; and
   a shifter to selectively shift the drive selector system between a scanning system drive position of the selector swing arm and a printing system drive position of the selector swing arm, the selector swing arm mechanically coupled to a capping system for a printhead wherein movement of the capping system to cap the printhead moves the selector arm to deliver power to the scan drive system and movement of the capping system to uncap the printhead moves the selector arm to deliver power to the print drive system.

2. The selectable drive printing device of claim 1, wherein the selector swing arm comprises:
   a first selector gear meshed with a drive gear coupled to the feedshaft;
   a second selector gear; and
   a pivot,
   wherein the selector swing arm pivots about the pivot to selectively mesh with a scan drive gear of the scan drive system.

3. The selectable drive printing device of claim 2, wherein the scan drive gear is mechanically coupled to a power take-off (PTO) shaft to drive the scan drive of the scan drive system.

4. The selectable drive printing device of claim 2, wherein the scan drive system comprises:
   a number of preliminary scan gears driven by the selector swing arm;
   a power take-off (PTO) shaft mechanically coupled to the preliminary scan gears; and
   a scan drive mechanically coupled to the PTO.

5. The selectable drive printing device of claim 4, wherein the preliminary scan gears comprise a number of bevel gears to transfer motion of the scan drive system approximately 90-degrees.

6. The selectable drive printing device of claim 1, wherein the scan drive comprises a worm gear set comprising a worm and a worm gear to transfer motion of the scan drive system approximately 90-degrees.

7. The selectable drive printing device of claim 6, wherein the worm gear set is geared to maximize available torque to the scan path.

8. The selectable drive printing device of claim 1, further comprising a feedshaft, the feedshaft selectively providing power from a motor to all of the print drive system, the scan drive system and the capping system.

9. The selectable driver printing device of claim 8, further comprising an output shaft to drive printing media out of the printing device, the output shaft connected to the and driven by the feedshaft via a one-way clutch.

10. The selectable driver printing device of claim 1, further comprising:
    a feedshaft; and
    a friction finger positioned to drag on the feedshaft to bias the shifter in a direction of rotation of the feedshaft.

11. A drive selector system for selecting between driving a print drive system and driving a scan drive system comprising:
    a feedshaft;
    a selector swing arm comprising:
       a first selector gear meshed with a drive gear coupled to the feedshaft;
       a second selector gear; and
       a pivot,
       wherein the selector swing arm pivots about the pivot to selectively mesh with a scan drive gear of the scan drive system; and
    wherein the feedshaft selectively provides power to all of the print drive system, a capping system of a printhead and, though the selector swing arm, the scan driver system.

12. The drive selector system of claim 11, wherein the first selector gear is continually meshed with the drive gear.

13. The drive selector system of claim 12, wherein the second selector gear is meshed with the scan drive gear of the scan drive system when the selector swing arm is in a scanning system drive position about the pivot and is neutral when the selector swing arm is in a printing system drive position about the pivot.

14. The drive selector system of claim 11, wherein the position of the selector swing arm with respect to the pivot used to selectively mesh with the scan drive gear of the scan drive system is based at least partially on a positon of a shifter rotatably coupled to the feedshaft.

15. The driver selector system of claim 11, wherein the selector swing arm is mechanically coupled to a capping system for a printhead and movement of the capping system to cap the printhead moves the selector swing arm to deliver power to the scan drive system.

16. The drive selector system of claim 15, wherein movement of the capping system to uncap the printhead moves the selector arm to disengage power from the scan drive system.

17. A scan drive system of a selectable drive printing device comprising:
   a feedshaft;
   a selector swing arm to selectively engage the feedshaft;
   a number of preliminary scan gears driven by the selector swing arm of the selectable drive printing device when the selector swing arm is engaged with the feedshaft;
   a power take-off (PTO) shaft mechanically coupled to the preliminary scan gears; and
   a scan drive mechanically coupled to the PTO;
   wherein the PTO shaft is perpendicular to the feedshaft.

18. The scan drive system of claim 17, wherein the preliminary scan gears comprise a number of bevel gears to transfer motion of the scan drive system approximately 90-degrees.

19. The scan drive system of claim 17, wherein the scan drive comprises a worm gear set comprising a worm and a worm gear to transfer motion of the scan drive system approximately 90-degrees.

20. The scan drive system of claim 17, wherein the scan drive system is mechanically coupled to a feedshaft of the selectable drive printing device, the feedshaft driving both the scan drive system and a print drive system based at least partially on a position of a selector swing arm mechanically coupled to the feedshaft.

* * * * *